(12) United States Patent
Thömmes et al.

(10) Patent No.: US 8,890,477 B2
(45) Date of Patent: Nov. 18, 2014

(54) CHARGING DEVICE FOR A HIGH-VOLTAGE BATTERY OF A MOTOR VEHICLE, CHARGING ASSEMBLY AND METHOD FOR OPERATING A CHARGING ASSEMBLY

(75) Inventors: Marco Thömmes, Ingolstadt (DE); Thomas Felkel, Ingolstadt (DE); Reiner Abl, Puchheim (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 14/110,317

(22) PCT Filed: Mar. 30, 2012

(86) PCT No.: PCT/EP2012/001416
§ 371 (c)(1),
(2), (4) Date: Nov. 26, 2013

(87) PCT Pub. No.: WO2012/136335
PCT Pub. Date: Oct. 11, 2012

(65) Prior Publication Data
US 2014/0091763 A1    Apr. 3, 2014

(30) Foreign Application Priority Data
Apr. 8, 2011  (DE) .................. 10 2011 016 537

(51) Int. Cl.
| | | |
|---|---|---|
| *H02J 7/00* | (2006.01) | |
| *H02J 7/04* | (2006.01) | |
| *H02H 3/16* | (2006.01) | |
| *H02H 3/33* | (2006.01) | |
| *B60L 3/04* | (2006.01) | |
| *B60L 3/00* | (2006.01) | |

(52) U.S. Cl.
CPC *H02J 7/04* (2013.01); *H02H 3/167* (2013.01); *H02H 3/332* (2013.01); *H02H 3/16* (2013.01); *Y02T 90/16* (2013.01); *B60L 3/04* (2013.01); *B60L 3/0069* (2013.01)

USPC .......... 320/109; 320/104; 320/107; 320/134; 320/136

(58) Field of Classification Search
USPC ......... 320/104, 109, 107, 134, 136, 137, 127, 320/128, 160, 163, 164, 165, 148, 149, 132, 320/138; 307/9.1, 10.1, 10.2, 10.3, 10.4, 307/10.8
See application file for complete search history.

(56) References Cited

U.S. PATENT DOCUMENTS 5,661,463 A * 8/1997 Letchak et al. .......... 340/636.15
6,630,747 B1 * 10/2003 Kamada et al. .............. 307/10.1

(Continued)

FOREIGN PATENT DOCUMENTS

EP    0 349 880    1/1990
EP    1 478 070    11/2004

(Continued)

OTHER PUBLICATIONS

International Search Report issued by the European Patent Office in Cinternational Application PCT/EP2012/001416 on Nov. 26, 2012.

*Primary Examiner* — Edward Tso
*Assistant Examiner* — Alexis A Boateng
(74) *Attorney, Agent, or Firm* — Henry M Feiereisen LLC

(57) ABSTRACT

A charging device installed in a motor vehicle is connected via a connection device to an AC mains. The connection device includes a residual current circuit breaker incapable of detecting at least one residual current type, in particular a DC residual current. A communication signal is transmitted between a control unit on the side of the charging device and a control unit on the side of the connection device. A residual current detector in the charging device detects a residual current of the undetected residual current type and transmits a residual current signal indicating the residual current to the charging-device-side control unit, which then modifies and/or interrupts the communication signal based the residual current signal so as to cause the charging device to be disconnected from the AC mains.

6 Claims, 1 Drawing Sheet

(56) References Cited

U.S. PATENT DOCUMENTS

| | | | |
|---|---|---|---|
| 6,642,628 B2 * | 11/2003 | Burdick et al. | 307/9.1 |
| 6,704,629 B2 * | 3/2004 | Huang | 701/33.9 |
| 6,804,098 B2 * | 10/2004 | Pannwitz | 361/90 |
| 7,173,347 B2 * | 2/2007 | Tani et al. | 307/10.1 |
| 7,567,057 B2 * | 7/2009 | Elder et al. | 320/104 |
| 2003/0200017 A1 * | 10/2003 | Capps et al. | 701/36 |
| 2005/0083015 A1 * | 4/2005 | Adachi | 320/116 |
| 2010/0065380 A1 * | 3/2010 | Chen et al. | 187/290 |

FOREIGN PATENT DOCUMENTS

| | | |
|---|---|---|
| EP | 2 218 607 | 8/2010 |
| EP | 2 236 345 | 10/2010 |
| JP | 2000-270463 | 9/2000 |

* cited by examiner

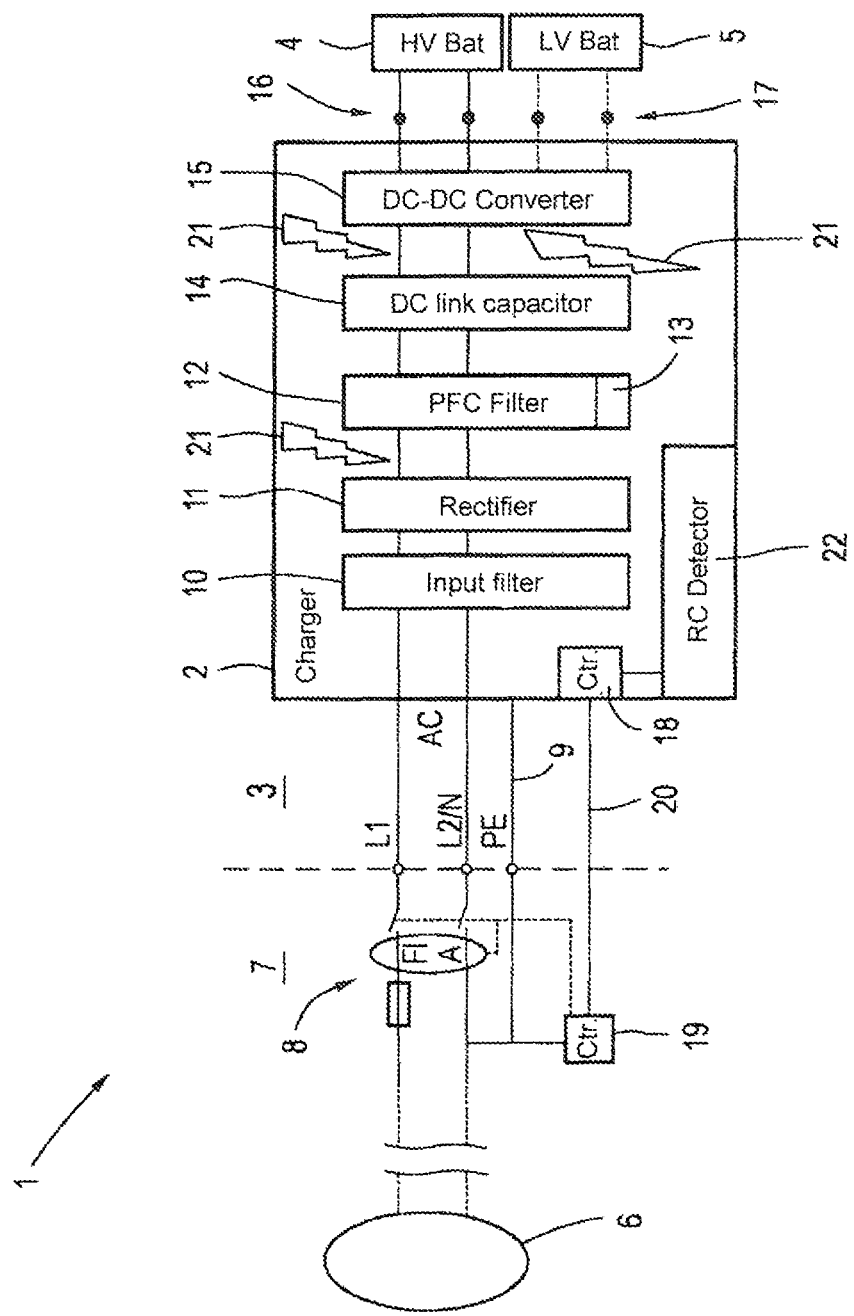

CHARGING DEVICE FOR A HIGH-VOLTAGE BATTERY OF A MOTOR VEHICLE, CHARGING ASSEMBLY AND METHOD FOR OPERATING A CHARGING ASSEMBLY

CROSS-REFERENCES TO RELATED APPLICATIONS

This application is the U.S. National Stage of International Application No. PCT/EP2012/001416, filed Mar. 30, 2012, which designated the United States and has been published as International Publication No. WO 2012/136335 and which claims the priority of German Patent Application, Serial No. 10 2011 016 537.1, filed Apr. 8, 2011, pursuant to 35 U.S.C. 119(a)-(d).

BACKGROUND OF THE INVENTION

The invention relates to a charging device for a high-voltage battery of a motor vehicle, in particular a charging device installed in a motor vehicle, wherein the charging device can be connected via a connection device to an AC mains, with the connection device including a residual current circuit breaker incapable of detecting a residual current of at least one type, especially a DC residual current, and wherein, when the connection device is connected to the charging device, at least one communication link for transmitting a communication signal between a charging-device-side control unit and a connection-device-side control unit is provided. The invention also relates to a charging assembly with such charging device and a connection device and a method for operating a charging assembly.

Motor vehicles are known that can also be operated with electrical energy, wherein electric vehicles receiving their propulsion energy solely from an electrical energy store, in particular a high-voltage battery, as well as hybrid vehicles obtained their propulsion energy in addition to the high-voltage battery from other energy sources, especially fossil fuels, have been disclosed.

In order to charge the high-voltage battery of such vehicle, it has been proposed to charge the high-voltage battery, in particular together with a low-voltage battery, from a conventional AC power supply, for example the residential network of the operator of the motor vehicle. While the additional low-voltage battery (also referred to as vehicle battery) has typically a voltage of about 12 V, the high-voltage battery has a higher voltage than the low-voltage battery, particularly a voltage above 50 V. High-voltage batteries with a battery voltage between 150 and 270 V are also known and in use. Thus, a special charging system is required to charge the high-voltage battery, preferably the high-voltage battery and the low-voltage battery. A charger, hereinafter also referred to as charging device, can be installed in the motor vehicle and may have a connector in which a mating connector with a charging cable can be inserted. The other side of the charging cable is connected, in particular via an electronics box and the like, with the AC network; optionally, a charging station with an appropriate charging cable may also be provided as connection to the AC mains.

Since this involves working with high-voltages and high currents, it is known to provide a residual current circuit breaker (FI switch) as protection against electric shock in the charging infrastructure, hereinafter referred to as connection device. Such a residual current circuit breaker can be installed, for example, in the charging station, in an electronics box in the charging cable or in the connector itself. It is also conceivable to already provide the FI-switch in or adjacent to a standard power outlet of the AC network. For cost and space considerations, it is common practice to use a type A residual current circuit breaker (FI type A). However, it has been observed that the type A residual current circuit breakers are unable to detect all residual currents that may occur in the charging device. These are so-called DC residual currents that would possibly be detectable with a type B residual current circuit breaker, which is however extremely large and expensive and is therefore rarely used.

Conventional chargers or charging devices usually operate with a communication signal that is transported via a dedicated communication link between the charging device and the connection device. Such communication signal is also referred to as "Control Pilot." The communication signal hereby indicates, for example, that a charging device is connected, but can also transport other information, for example the power requirement, characteristic parameters of the high-voltage battery and the like. The communication signal is suitably processed by a connection-device-side control unit, it is common practice to interrupt in the absence of the communication signal the power supply to the charging-device-side terminals, in particular to a connector, of the connection device, because no connected charging device is indicated.

SUMMARY OF THE INVENTION

It is therefore an object of the invention to improve a charging device so as to provide increased safety for an operator from currents that are not detectable by an existing residual current circuit breaker, in particular a type A residual current circuit breaker.

To attain this object the invention, a charging device (2) of the aforedescribed type includes a residual current detection device for detecting a residual current of the type of residual current, which residual current detection device is configured to transmit to the connection-device-side control unit a residual current signal indicating a residual current, which is configured to modify and/or interrupt the communication signal in response to the residual current signal so that the charging device is disconnected from the AC mains.

The residual current circuit breaker is in particular a type A fault circuit current breaker, and the non-detectable residual currents, i.e. the at least one of type of residual current, are DC residual currents. Such DC residual currents occur in particular near components that are connected downstream of the rectifier, which is used to charge the high-voltage battery and, optionally, the low-voltage battery. The concept underlying the present invention is to detect the residual current within the charger, i.e. the charging device, and to then influence the communication signal when a residual current is present. This change or preferably interruption of the communication signal then causes the charging device to be disconnected from the high-voltage network due to the design of the corresponding connection. The then causes the system to shut down, so that the safety of the charging assembly can be maintained without requiring a larger and more expensive residual current circuit breaker, particularly a residual current circuit breaker of type B. In particular, when the functionality of the switch-off has already been implemented in the connection device when communication signal is absent, an existing functionality can advantageously be used to further enhance safety.

According to another embodiment of the present invention, the residual current detection device may be implemented as a residual current monitor (RCM). Such RCMs are known in the art and monitor the difference current in electrical systems. When a specific difference current is exceeded, the RCM signals that this critical value has been exceeded, in particular via signaling contacts, so that this message can then be used to suitably modify the characteristic of a detected residual current through appropriate control of the component.

It is particularly advantageous in this context when the residual current detection device is configured to detect several, in particular all types of residual currents. Thus, the protection against residual current types that are detected by both the residual current detection device and the residual current circuit breaker, is ultimately doubled, thus further enhancing safety.

In addition to the charging device, the invention also relates to a charging assembly having a charging device according to the invention and the connection device. All statements concerning the charging device can analogously be applied to the charging assembly, thereby attaining the same advantages of the invention. It should be noted at this point that the residual current circuit breaker can be arranged in various components of the connection device, particularly in an electronics box, a charging station, the plug, or even as a part of the infrastructure of a house itself, for example, installed in a standard wall outlet.

In another embodiment of the invention, for separating the charging device (2) from the AC mains (5), the connection device-side control unit may be configured to open the residual current circuit breaker (8), when a communication signal is absent and/or has been modified. Conveniently, an already existing functionality may be used, which deactivates a component to be connected to the charging device, especially a plug, when no communication signal is present. Consequently, an existing functionality is shared to enhance safety. It should be noted that the control unit of the connection device can also be selectively enhanced to include such functionality, when this functionality is not already included.

Lastly, the invention also relates to a method for operating a charging assembly, in particular a charging assembly according to the invention for a high-voltage battery in a motor vehicle, which here includes a charging device which may advantageously be installed on a motor vehicle itself. A connection device enables connection of the charging device for charging the high-voltage battery to an AC mains, wherein the connection device includes a residual current circuit breaker incapable of detecting a residual current of at least one residual current type, especially a DC residual current. A charging-device-side control unit can send a communication signal via a communication link to a connection-device-side communication unit; communication in the reverse direction is also feasible. According to the method of the invention, a residual current is measured within the charging device, and when a residual current that cannot be detected by the residual current circuit breaker is present, the communication signal is modified or interrupted, causing the charging device (2) to be disconnected on the connection side from the mains (6). In this case, for example, the residual current circuit breaker may be opened; however, it is also conceivable to use another switching device, for example, when the residual current circuit breaker is installed in a wall socket. All statements concerning the charging device and the charging assembly according to the invention can likewise be applied to the method according to the invention.

BRIEF DESCRIPTION OF THE DRAWING

Further advantages and details of the present invention will become apparent from the following exemplary embodiments and the with reference to the drawings.

FIG. 1 shows a schematic diagram of a charging system according to the invention.

DETAILED DESCRIPTION OF PREFERRED EMBODIMENTS

FIG. 1 shows a schematic diagram of a charging system 1 according to the invention. It includes a charging device 2 which is installed in a motor vehicle 3 (not shown in detail). The charging device 2 is used to charge a high-voltage battery 4 installed in the motor vehicle 3, which in the present illustrated example requires a charging voltage in the range of 200 V. The motor vehicle 3 further includes a low-voltage battery 5 (system battery) which can also charged via the charging system 1. The low-voltage battery 5 operates at a battery voltage of 12 V, whereas the high-voltage battery generally operates at a higher battery voltage, The charging device 2 is operated with AC power from a conventional AC mains 6, for example the 220 V AC mains that is standard in Germany. To connect the charger 2 installed in the motor vehicle 3 to the AC mains 6, a connection device 7 is provided, of which only the relevant components are schematically illustrated. The connection device 7 may include a charging cable having plugs on both ends, wherein one plug is configured to be inserted in a corresponding unillustrated connector of the charging device 2, wherein the other connector is inserted, for example, in a conventional socket of the AC mains 6. To prevent an electric shock to an operator, the connection device includes a residual current circuit breaker 8 which is formed here as a residual current circuit breaker of type A. The residual current circuit breaker may be arranged, for example, in a connector of the connection device 7, an electronics box of the coupling device 7, a charging station of the connection device 7 or the like; however, the residual current circuit breaker may also be arranged in or adjacent to a socket of the AC system 6 provided for connecting a charging cable or a charging station, which is to be understood within the context of the present invention as a part of the connection device 7.

Presently, single-phase charging is illustrated. It should be noted here that, as is customary with such charging systems 1, of course, a protective conductor 9 (PE) may also be provided.

The charging device 2 includes, as usual, first an input filter 10, with a rectifier 11 connected downstream. A power factor correction filter 12 (PFC), which is here implemented as an active PFC with a clocking element 13, is connected directly downstream of the rectifier 11. The power factor correction filter 12 is typically used in charging devices, which ensures that a sinusoidal load is drawn from the infrastructure.

A DC link capacitor 14 is connected downstream of the power factor correction filter 12. As is typical, a standard DC-DC converter is connected downstream, which provides the necessary charging voltages at the terminals 16 and 17.

Both the charging device 2 and the connection device 7 further include a control unit 18, 19, which when the charging device 2 is connected, can realize a communication link 20 with each other, which is implemented via appropriate cables and contacts in the plug and the terminal. In normal operation, the control unit 18 of the charging device 2 transmits a communication signal, the so-called "Control Pilot", to the control unit 19 of the connection device 7. The communication signal hereby indicates, on one hand, that a charging device 2 is connected, but may, on the other hand, transport additional information, for example the specifications of the high-voltage battery 4.

The residual current circuit breaker 8 of type A is unable to detect DC residual currents within the charging device 2, for example at the positions 21. To ensure greater safety, the charging device 2 therefore includes a residual current detection device 22 capable of detecting DC currents. The residual current detection device 22 is hereby a residual current monitor (RCM). When the residual current monitor measures a residual current, a corresponding signal is forwarded to the control unit 18 which in response interrupts the communication signal; alternatively, but less preferred, the communication signal may also be modified.

When the control unit 19 no longer receives a communication signal, it is assumed that an (intact) charging device is no longer connected, so that the control unit 19 automatically immediately triggers and opens the residual current protection switch 8. This triggers a separation of the charging device 2 from the AC mains 6, thereby preventing an electrical shock due to the residual direct current and ensuring the safety of the operator.

It should be noted again at this point that the residual current detection device 22 can also be configured to detect other types of residual currents, which can in principle be detected by the residual current circuit breaker 8. A kind of "double" protection for these residual currents is thus realized.

It should also be noted that, especially when the desired behavior is not already provided in the connection device 7, the connection device 7 can of course be easily modified so as to still trigger a disconnection when the communication signal is absent or has been modified. In particular, a different switch can also be used instead of the residual current circuit breaker 8.

The invention claimed is:

1. A charging assembly comprising:
    a connection device comprising a residual current circuit breaker which is unable to detect a residual current of at least one residual current type,
    a charging device for a high-voltage battery of a motor vehicle, wherein the charging device is connected via the connection device to an AC mains and comprises a residual current detection device for detecting a residual current of the at least one residual current type that is not detected by the residual current circuit breaker,
    a charging device-side control unit,
    a connection-device-side control unit, and
    at least one communication link for transmitting between the charging device-side control unit and the connection-device-side control unit a communication signal when the connection device is connected to the charging device,
    wherein the residual current detection device is configured to transmit a residual current signal indicative of the residual current to the charging-device-side control unit, with the charging-device-side control unit being configured to modify and/or interrupt the communication signal in response to the residual current signal so as to cause the charging device to be disconnected from the AC mains, wherein the connection-device-side control unit is configured to open the residual current circuit breaker when the communication signal is absent or has been modified, thereby disconnecting the charging device from the AC mains.

2. The charging assembly of claim 1, wherein the charging device is installed in the motor vehicle.

3. The charging assembly of claim 1, wherein the residual current is a DC residual current.

4. The charging assembly of claim 1, wherein the residual current detection device is constructed as a residual current monitor.

5. The charging assembly of claim 1, wherein the residual current detection device is configured to detect a plurality of residual current types.

6. A method for operating a charging assembly for a high-voltage battery of a motor vehicle, wherein the charging assembly comprises a charging device unable to detect a residual current of at least one residual current type and a connection device, the method comprising:
    measuring a residual current within the charging device, and
    when a residual current of the at least one residual current type that cannot be detected by a residual current circuit breaker is present, modifying or interrupting a communication signal, thereby causing a connection-device-side control unit to open the residual current circuit breaker and disconnect the charging device from a power mains.

* * * * *

UNITED STATES PATENT AND TRADEMARK OFFICE
CERTIFICATE OF CORRECTION

| | |
|---|---|
| PATENT NO. | : 8,890,477 B2 |
| APPLICATION NO. | : 14/110317 |
| DATED | : November 18, 2014 |
| INVENTOR(S) | : Marco Thömmes, Thomas Felkel and Reiner Abl |

It is certified that error appears in the above-identified patent and that said Letters Patent is hereby corrected as shown below:

Title page: ABSTRACT, column 2 (57), line 12, change "based the residual" to -- based on the residual --.

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

PATENT NO. : 8,890,477 B2  
APPLICATION NO. : 14/110317  
DATED : November 18, 2014  
INVENTOR(S) : Marco Thömmes, Thomas Felkel and Reiner Abl It is certified that error appears in the above-identified patent and that said Letters Patent is hereby corrected as shown below:

Title page: Please add (73) Assignee: -- Volkswagen AG, Wolfsburg (DE) --

Signed and Sealed this

Thirteenth Day of October, 2015

Michelle K. Lee  
*Director of the United States Patent and Trademark Office*